INVENTOR
ROBERT K. SEDGWICK
ATTORNEY

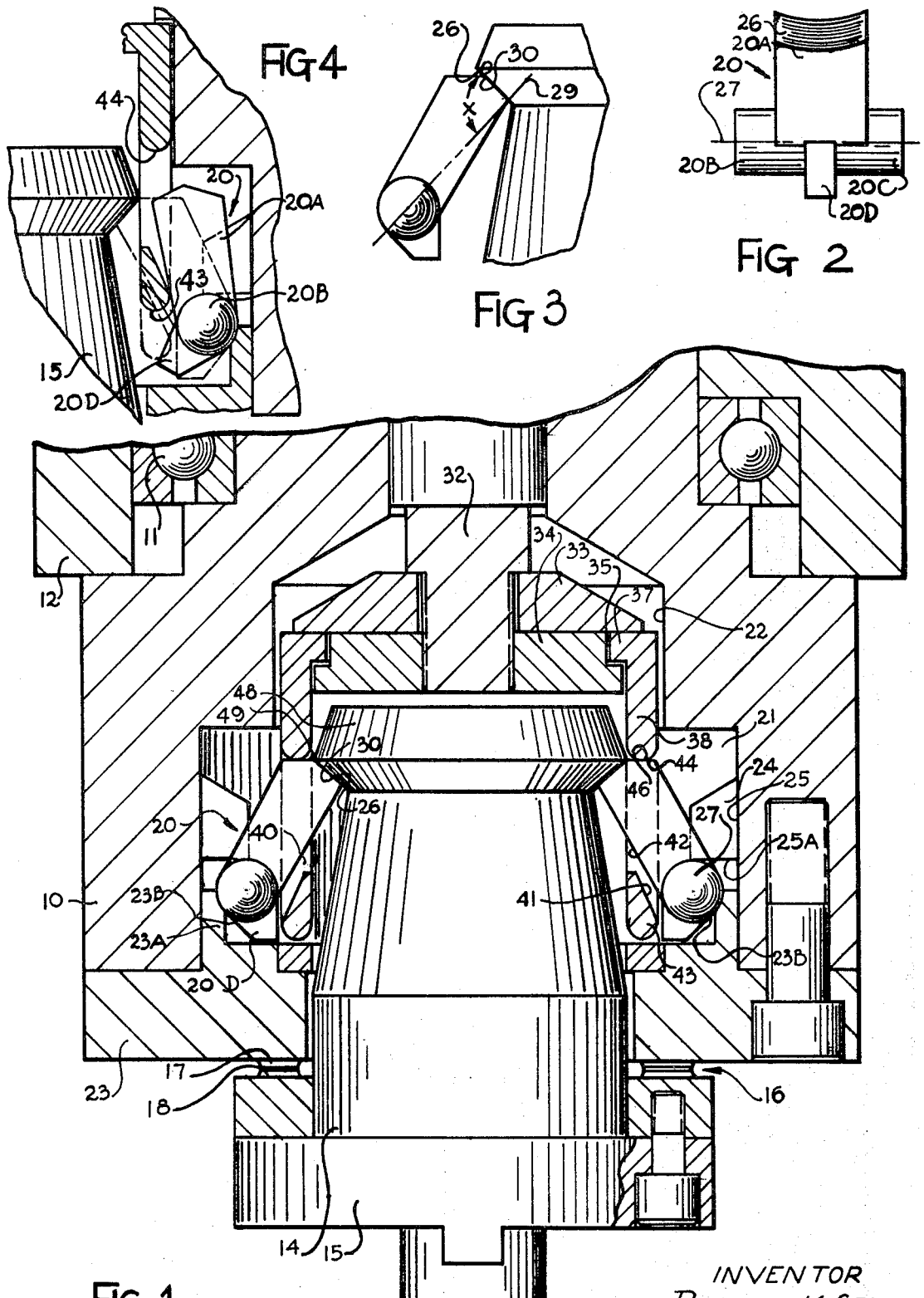

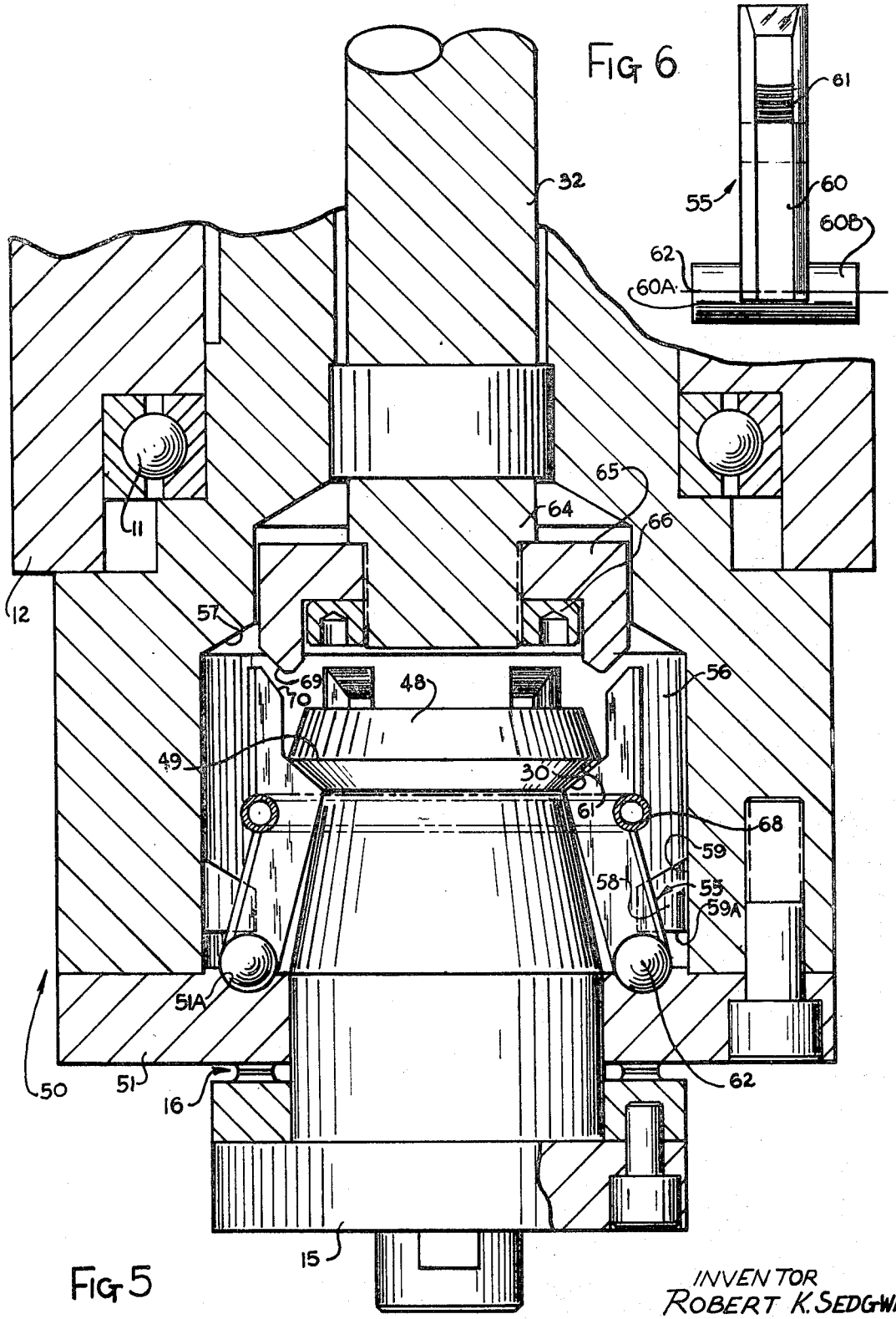

United States Patent Office 3,533,638
Patented Oct. 13, 1970

3,533,638
TOOL LOCKING MECHANISM
Robert K. Sedgwick, Brookfield, Wis., assignor to Kearney & Trecker Corporation, West Allis, Wis., a corporation of Wisconsin
Filed May 20, 1968, Ser. No. 730,440
Int. Cl. B23b *31/10, 31/18*
U.S. Cl. 279—89      3 Claims

ABSTRACT OF THE DISCLOSURE

A plurality of latches are utilized within the spindle of a machine tool to pivotally engage a bearing surface on a tool arbor. Within the arbor cavity of the spindle, there is provided an actuator mechanism which is attached to a drawbar operable to effect the movement of the latches into and out of locking position.

BACKGROUND OF THE INVENTION

The present invention relates generally to improvements in spindle and tool arbor construction and more particularly to spindles and tool arbors adapted for the quick change of tools.

SUMMARY OF THE INVENTION

According to this invention, there is provided an improved locking means in a machine tool spindle for the quick and positive retention of a tool arbor. The operating end of the spindle is provided with an enlarged cavity in which a plurality of latches are adapted to be moved radially into wedging engagement with a conical bearing surface formed on the inwardly extending end of the tool arbor. Each latch has a bearing surface which is slightly tilted with respect to the swing radius of the latch so that the angle formed by a swing radius line drawn through the leading inward edge of the latch bearing surface and a line drawn tangent to said latch bearing surface will form an angle greater than 90°. Thus, when the latches are swung into the arbor locking position, the slightly tilted bearing surface of each latch will swing into full bearing contact with the bearing surface on the arbor. Within the arbor cavity of the spindle, there is provided an actuator mechanism which is attached to a drawbar operable to effect the movement of the latches into and out of locking position.

It is the general object of the invention to provide a machine tool spindle with improved tool arbor locking means to provide for the quick change of tools.

It is another object of this invention to provide a tool arbor locking mechanism which is rigid in the axial direction.

It is another object of this invention to provide a tool spindle with a plurality of force applying tool latch mechanisms which are automatically moved into tool locking position.

It is another object of this invention to provide tool arbor locking latches which are subjected to compressive forces only while in the locking position.

It is a further object of this invention to provide an improved spindle having tool arbor locking latches which are self seating under working stresses.

DESCRIPTION OF THE DRAWINGS

FIG. 1 is a fragmentary view in vertical section through a machine tool spindle incorporating the features of the present invention;

FIG. 2 is an enlarged detailed view in front elevation of a locking latch, shown in FIG. 1;

FIG. 3 is a detail view showing the angular relationship between the bearing surface of the locking latch and the bearing surface of the tool arbor, as shown in FIG. 1;

FIG. 4 is an enlarged fragmentary side view of a latch of FIG. 1, showing the latch actuating mechanism and one of the locking latches in a released position;

FIG. 5 is a fragmentary view in vertical section illustrating a modified spindle assembly incorporating a modified tool latching arrangement;

FIG. 6 is an enlarged detailed view in front elevation of a modified locking latch, shown in FIG. 5;

DESCRIPTION OF THE PREFERRED EMBODIMENTS

Figure 7:
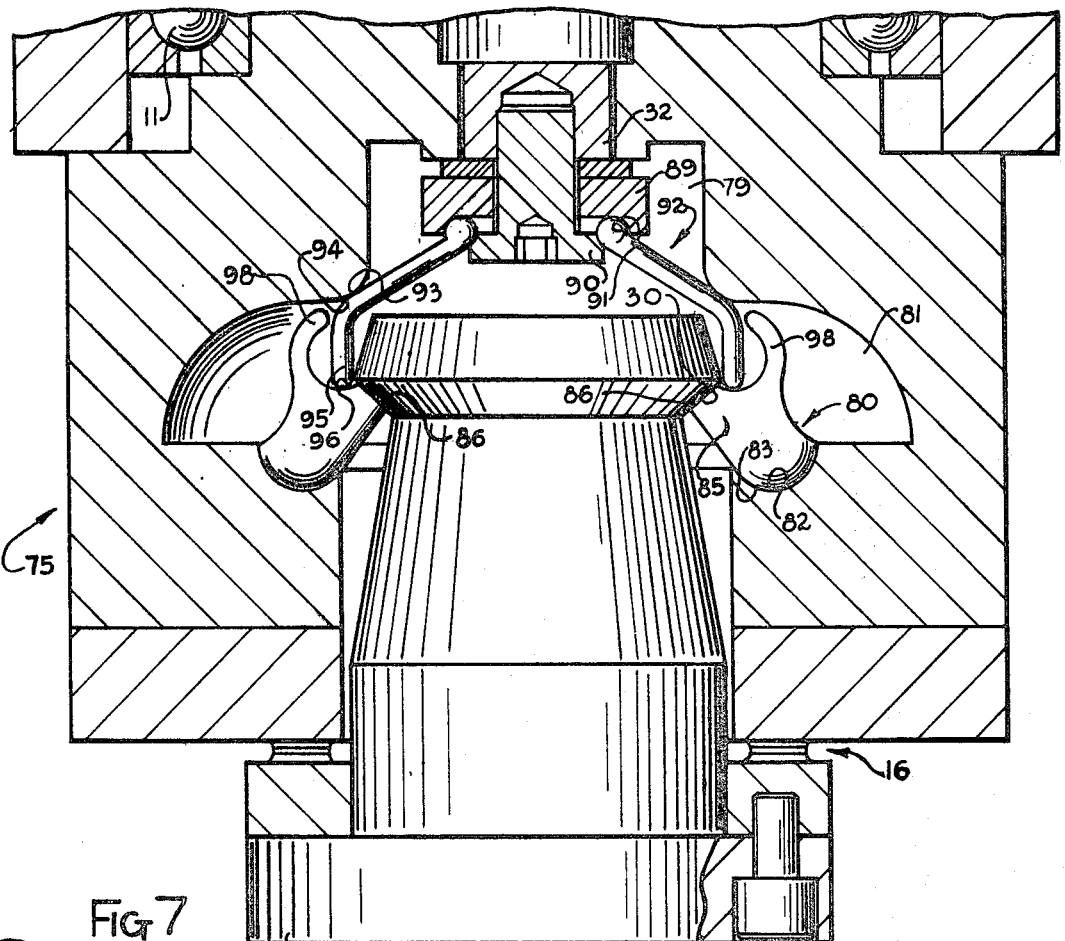
FIG. 7 is a fragmentary view in vertical section illustrating another modification of the spindle assembly of FIG. 1 incorporating another modification of a tool latching arrangement.

Referring now to the drawings, and more specifically to FIG. 1 thereof, illustrating a machine tool spindle and a tool arbor incorporating the features of the present invention. As there shown, the lower end of the spindle 10 is rotatably supported at its forward end by a bearing 11 which is fixedly disposed in a spindle housing 12. A tool arbor 15 having a straight shank portion 14 is positioned in axial alignment in the spindle 10 by operation of a tooth coupling 16. The coupling 16 comprises an upper half portion 17 which is secured to the spindle 10 and a lower half portion 18, which is secured to the tool arbor 15. Each half portion 17 and 18 have complementary radially formed angular clutched teeth adapted to meshingly engage with each other. As a result, with the tool arbor 15 inserted into the spindle 10 the arbor 15 will be automatically centered with respect to the spindle 10 so that the axis of the spindle 10 will coincide with the axis of the tool arbor 15 and a driving connection between the tool arbor 15 and the spindle 10 will also be established.

To quickly and positively lock a tool carrying arbor in operative position within the spindle 10 a plurality of radially movable tool locking latches are provided. The locking latches 20 are pivotably mounted within a counterbore 21 formed in an angular arbor cavity 22 provided in the spindle 10 being pivotably supported therein in a plurality of equally spaced semi-circular recesses 23B that are formed on the inner edge of a collar portion 23A of a spindle nose plate 23. A circumferential inwardly extending flange 24 is formed within the counterbore 21. The flange 24 has a plurality of spaced recesses 25 to receive the latches 20 when they pivot out of tool lock position. A plurality of support surfaces 25A located on the flange 24 keeps the latches 20 from lifting out of the recesses 23B. One of the latches 20 will be described in detail with the understanding that the description will apply to all of the latches. As shown in FIGS. 1 and 2, the latch 20 comprises a body portion 20A having a pair of oppositely laterally extending cylindrical arms 20B and 20C which are adapted to be received in the recess 23B of the collar portion 23A. The lower end of the latch body portion 20A is provided with a lever arm 20D which is disposed midway between the ends of the arms 20B and 20C. Each latch 20 pivots about an axis 27 which coincides with a line running through the center of the lateral cylindrical extension arms 20B and 20C. The end of the latch 20 opposite the lever arm portion 20D is provided with a conical bearing surface 26 which is complementary to a conical bearing surface 30 formed on the shank of the tool arbor 15. The latch bearing surface 26 is slightly tilted with respect to a swing radius of the latch. The angular relationship of the surfaces 26 and 30 is shown in detail in FIG. 3. The intercept of a line which is tangent to the conical surface 26 and a line which is perpendicular to the axis 27, about which the latch pivots, and runs through the leading edge 29 of surface 26 forms an included angle $x$ which is slightly more than 90° so that a non-sticking relationship is established between the surface 26 of the latch and the surface of the arbor when the latch is in engagement with the arbor surface 30. The position of the latch 20 when it is in the tool arbor lock position is shown in dotted lines in FIG. 4 and the position of the latch 20 when it is in the tool arbor release position is shown by solid lines in the same drawing.

The forward threaded end of the drawbar 32 extends inwardly into the arbor cavity 22, as shown in FIG. 1. The drawbar 32 is urged in a downward direction, as shown in FIG. 1, which is the tool arbor lock position, by a spring (not shown) or by gravity alone and is moved in an axially upward direction, which is the tool arbor release position, by a power actuator (not shown) or manually in a well-known manner. A collar 33 is secured to the threaded end of the drawbar 32 by a nut 34. The collar 33 and the nut 34 cooperate to form a circular groove 35 which receives an inwardly extending radial flange 37 formed on the upper end of a cylindrically shaped cage 38. The cage 38 has a plurality of windows 40 formed in it through which the plurality of latches 20 pass as they pivot into and out of a tool locking position.

When the drawbar 32 is moved axially upward from the tool arbor locked position that it occupies, as shown in FIG. 1, the cage 38 will move upwardly, as viewed in FIG. 1, with the drawbar 32. As the cage 38 moves in the upward direction, its lower window surface 41 will come in contact with latch surface 42. The upper movement of the cage 38 will effect the pivotal movement of the latches in a radially outward direction moving them out of engagement with the tool arbor 15. On the other hand, when the drawbar 32 is moved downward to a locking position that it occupies, as shown in FIG. 1, the lower edge 43 of the cage 38 will come in contact with the tip extension 20D of the latch, as depicted by the broken lines in FIG. 4, which will move the latch radially inward into engagement with the tool arbor bearing surface 30. The top edge 44 of the window 40 will exert a downward pressure on the latch surface 46, as depicted in FIG. 1, which will serve to retain the latch 20 in a locked position.

With the spindle arrangement shown in FIG. 1, it is not necessary to actuate the drawbar 32 in order to place a new tool arbor in the spindle 10. When a tool arbor 15 is inserted in the spindle 10, the leading upper annular conical arbor surface 48 will engage the latches 20 and will effect their radially outward movement. The outward movement of the latches 20 will raise the cage 38 and drawbar 32 until the latches 20 ride over the lower edge 49 of the tool arbor surface 48 at which time the latches will move radially inward and wedgingly engage the arbor bearing surface 30. The latches 20 will be held in the tool arbor lock position by upper surfaces 44 of the windows 40 of the cage 38. To release the tool arbor 15, the drawbar 32 is actuated upwardly and the upward movement of the drawbar 32 and cage 38 will serve to move the lower side surface 41 of each cage window 40 into forceful engagement with the adjacent side of an associated latch 20. This action will flip the latches out of wedging engagement with the arbor bearing surface 30 and the arbor 15 will be released from the spindle 10.

FIG. 5 illustrates a modified form of the invention, shown in FIG. 1. The construction of the tool arbor 15 and toothed coupling 16 between the arbor 15 and the spindle is the same as previously described.

A plurality of latches, indicated generally by the reference number 55, are pivotably mounted within a counterbore 56 formed in an arbor activity 57 provided in the spindle 50, being pivotably supported therein in a plurality of equally spaced semi-circular recesses 51A that are formed on the inner edge of a spindle nose plate 51. A circumferential inwardly extending flange 58 is formed within the counterbore 56. The flange 58 has a plurality of spaced recesses 59 to receive the latches 55 when they pivot out of tool lock position. A plurality of support surfaces 59A located on the flange 24 keeps the latches 55 from lifting out of the recesses 51A. One of the latches 55 will be described in detail with the understanding that the same description will apply to the rest of the latches. As shown in FIGS. 5 and 6, the latch 55 comprises a body portion 60 having a pair of oppositely laterally extending cylindrical arms 60A and 60B which are adapted to be received in the recess 51A of the spindle nose plate 51. With the latch 55 supported in position in the counterbore 56 the latch will pivot about an axis 62 which is a line running through the center of the cylindrical extending arms 60A and 60B. A conical bearing surface 61 is provided on the latch 55 and is complementary to the conical bearing surface 30 formed on the shank of the tool arbor 15. The latch bearing surface 61 is slightly tilted with respect to the swing radius of the latch 55 in the same manner as described for the bearing surface 26 of the latch 20 so that a non-sticking angular relationship is established between the bearing surface 61 of each latch and the conical bearing surface 30 on the tool arbor when the latch moves into locking position.

The latches 55 are urged inwardly toward the center line of the spindle 50 into arbor locking position by a garter spring 68. With no tool arbor in the spindle the latches are urged inwardly by the spring 68 until they come in contact with the annular surface 69 of the sleeve 65. When a tool arbor 15 is inserted in the spindle 10, the leading upper annular conical arbor surface 48 will engage the latches 55 and will effect their radially outward movement against the pressure of the spring 68. The latches 55 will be pushed radially outward until the lower edge 49 of the tool arbor surface 48 passes by the bearing surface 61 of the latches 55 at which time the latches will move radially inward and wedgingly engage the arbor bearing surface 30. As shown in FIG. 5, the latches 55 will be held in the tool arbor lock position by the pressure exerted by the spring 68.

The forward threaded end of the drawbar 32 extends inwardly into the arbor cavity 57, as shown in FIG. 5. The drawbar 32 is urged in an upward direction, as shown in FIG. 1, which is the tool arbor lock position, by a spring (not shown) and is moved in an axially downward direction, which is the tool arbor release position, by a power actuator (not shown) or manually in a well-known manner. A collar 65 is secured to the threaded end of the drawbar 32 by a nut 66.

When it is desired to release a tool arbor from the spindle the drawbar power actuator (not shown) is energized moving the drawbar 32 and collar 65 in an axially downward direction. This movement will operate to effect the engagement of the conical surface 69 of the collar 65 with the inwardly inclined surface 70 of the latches forcing the latches to pivot outwardly about the pivot axis 62 thereby releasing the tool arbor.

FIG. 7 illustrates another modified form of the invention, shown in FIG. 1. The construction of the tool arbor 15 and toothed coupling 16 between the arbor 15 and the spindle 75 is the same as previously described.

Figures 8, 9, 10:
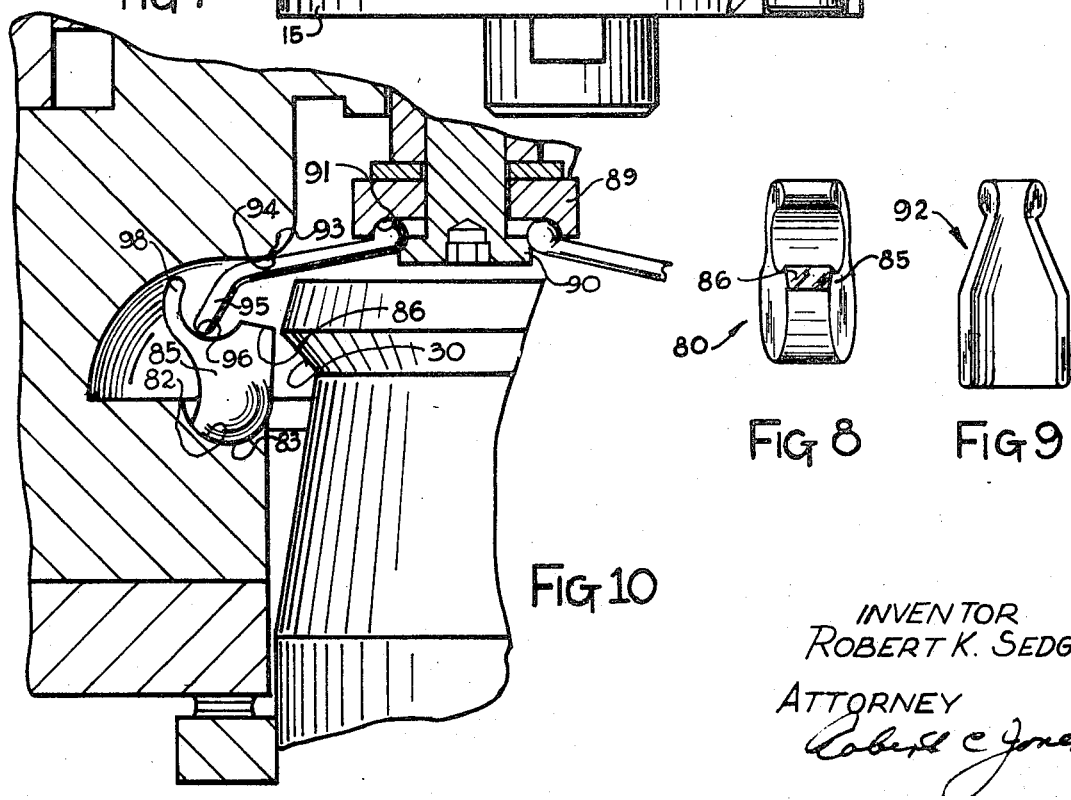
FIG. 8 is an enlarged detailed view in front elevation of a modified locking latch, shown in FIG. 7.
FIG. 9 is an enlarged detailed view in front elevation of a link actuator, shown in FIG. 7; and, FIG. 10 is an enlarged fragmentary side view of a latch of FIG. 7, showing the position of the latch and its associated link in a released position.

A plurality of latches 80 are disposed within and occupy substantially all of the annular space 81 formed in the opening of the spindle 75. The annular space 81 is formed with an annular spherical groove 82 which is complementary to the spherical surface 83 formed on each of the latches 80. As shown in FIG. 8, each latch 80 has a finger 85 having a conical surface 86 complementary to the conical surface 30 formed on the shank of the tool arbor 15. The bearing surfaces 86 of the latches 80 are likewise slightly tilted with respect to the swing radius of the latch in the same manner as described for the bearing surface 26 of the latch 20 so that a non-sticking angular relationship is established between the bearing surface 86 of each latch and the conical bearing surface 30 on the tool arbor when the latch moves into locking position.

The lower end of the drawbar 32 extends inwardly into the arbor cavity 79, as shown in FIG. 7. The drawbar 32 is urged in an upward direction, as shown in FIG. 7, which is the tool arbor lock position, by a spring (not shown). And the drawbar is moved in an axially downward direction, as shown in FIG. 10, which is the tool arbor release position, by a power actuator (not shown) or manually is a well-known manner. A washer 89 is secured to the lower end of the drawbar 32 by a screw 90. The washer 89 and the screw 90 cooperate to form a circular groove 91 which receives a plurality of links 92, as shown in FIGS. 7, 9 and 10. The links 92 are loosely held in the groove 91 so that they may be free to pivot from their tool arbor lock positioning, as shown in FIG. 7, to their tool arbor release position, as shown in FIG. 10. The links 92 are formed by cutting an annular shaped shell into segmented pieces of equal size, one of which is shown in detail in FIG. 9.

When it is desired to place a new tool arbor in the spindle 75 the drawbar is moved axially downward, as shown in FIG. 10, by the power actuator (not shown) and then the tool arbor is placed in the spindle. With the tool arbor in position within the spindle 75, the drawbar 32 is moved axially upward, thereby drawing the plurality of links 92 axially upward and radially inward. As the links 92 are moved upwardly and inwardly, as viewed in FIG. 7, a shoulder 93 of each link 92 engages the circular surface 94 within the annular space 81. This combination of movements, that is the axially upward movement of the links 92 and the engagement of the link shoulders 93 with the annular surface 94, will operate to effect the pivotal movement of each link so that the lower leg 95 of each link 92 is caused to move radially inwardly. As the legs 95 of the links 92 move radially inward the ends thereof engage a surface 96 of each sprag finger 85 forcing the sprags to pivot in the spherical groove 82. This will serve to forcefully engage the bearing surface 86 of each finger 85 with the conical bearing surface 30 on the tool arbor 15 effecting the seating and locking of the tool arbor in the spindle.

To release the tool arbor 15 from the spindle 75, the drawbar 32 is moved axially downward by actuating the power actuator (not shown), thereby moving the plurality of links 92 axially downward and radially outward. As the links 92 are moved downwardly and outward, a shoulder 93 of each link 92 engages a thumb 98 on each latch 92. This combination of movements, that is the axially downward and radially outward movement of the links 92 and the engagement of the link shoulders 93 with the latch thumb 98, will operate to effect the pivotal movement of the latch 80 in the spherical groove 82, moving the latch finger 85 out of engagement with the tool arbor bearing surface 30, as shown in FIG. 10.

From the foregoing detailed description of the illustrative embodiments set forth herein to exemplify the present invention, it will be apparent that there has been provided an arrangement for rapid looking of a tool arbor through the use of a toothed coupling or other keying device that provides location of the tool arbor in the spindle combined with a latching system that locks the tool arbor in the spindle.

The principles of this invention having now been fully explained, I hereby claim as my invention:

1. In a tool locking mechanism for a rotatable spindle of a machine having an axial opening adapted to receive a tool arbor;

a tool arbor adapted to be received within the axial opening provided in said spindle, said tool arbor being provided with a bearing surface on the end thereof that is received within said spindle;

a plurality of latch members pivotally supported by said spindle within the opening thereof for rotation with the spindle, said latch members being disposed within the spindle opening in spaced circumferential relationship about the axis of the spindle for pivotal movement relative to the spindle into locking engagement with said bearing surface provided on said tool arbor;

a cage member disposed within the axial opening in said spindle for rotation with said spindle and for independent axial movement relative to said spindle, said cage member being operable when moved axially in one direction to engage said latch members and effect their simultaneous pivotal movement into locking engagement with said bearing surface on said tool arbor, said cage member being also operable when moved in the opposite axial direction relative to said spindle to engage said latch members and effect their simultaneous pivotal movement out of locking engagement with said bearing surface of said tool arbor to release said tool arbor for removal from the spindle; and, a coupling mechanism comprising a first tooth coupling portion which is secured to said spindle and a second tooth coupling portion secured to said tool arbor, said first and second portions having complementary radially formed angular clutch teeth adapted to meshingly engage with each other;

whereby the tool arbor when inserted within the axial opening in said spindle will be automatically centered with respect to said spindle and a positive driving connection between said tool arbor and said spindle is established.

2. In a tool locking mechanism for a rotatable spindle of a machine having an axial opening adapted to receive a tool arbor;

a tool arbor adapted to be received within the axial opening provided in said spindle, said tool arbor being provided with a bearing surface on the end thereof that is received within said spindle;

a plurality of latch members pivotally supported by said spindle within the opening thereof for rotation with the spindle, said latch members being disposed within the spindle opening in spaced circumferential relationship about the axis of the spindle for pivotal movement relative to the spindle into locking engagement with said bearing surface provided on said tool arbor, said latch members being provided with bearing surfaces to engage with the bearing surface provided on said tool arbor, said bearing surface on each of said latch members being slightly tilted with respect to the swing radius of the individual latch member so that a nonsticking angular relationship is established between the bearing surface of each of said latch members and the bearing surface on said tool arbor when said latch members are in locking engagement with the tool arbor; and, an actuator supported within the axial opening in the spindle for rotation with the spindle and for independent axial movement relative to the spindle, said actuator being operable when moved in one axial direction to engage said latch members and effect their simultaneous pivotal movement into locking engagement with the bearing surface on said tool arbor to lock said tool arbor in said spindle, said actuator being also operable when moved in the opposite axial direction to engage said latch members and effect their simultaneous pivotal movement out of locking engagement with said tool arbor to release said tool arbor for removal from the spindle.

3. In a tool locking mechanism for a rotatable spindle of a machine having an axial opening adapted to receive a tool arbor;

- a tool arbor adapted to be received within the axial opening provided in said spindle, said tool arbor being provided with a bearing surface on the end thereof that is received within said spindle;
- a plurality of latch members pivotally supported by said spindle within the opening thereof for rotation with the spindle, said latch members being disposed within the spindle opening in spaced circumferential relationship about the axis of the spindle for pivotal movement relative to the spindle into locking engagement with said bearing surface provided on said tool arbor, said latch members being constructed and arranged so that a force tending to pull said tool arbor out of the spindle will be transmitted to each latch member as a compressive force which develops a reactionary force between the spindle and the bearing surface of said tool arbor to prevent tool arbor pull-out; and,
- a cage member disposed within the axial opening in said spindle for rotation with said spindle and for independent axial movement relative to said spindle, said cage member being operable when moved axially in one direction to engage said latch members and effect their simultaneous pivotal movement into locking engagement with said bearing surface on said tool arbor, said cage member being also operable when moved into the opposite axial direction relative to said spindle to engage said latch members and effect their simultaneous pivotal movement out of locking engagement with said bearing surface of said tool arbor to release said tool arbor for removal from the spindle.

References Cited

UNITED STATES PATENTS

| 329,126 | 10/1885 | Booth | 279—109 XR |
| 2,773,437 | 12/1956 | Knauf | 279—37 XR |
| 3,240,520 | 3/1966 | Dailey | 279—37 XR |

FOREIGN PATENTS 1,298,825     1962     France.

ROBERT C. RIORDON, Primary Examiner

D. D. EVENSON, Assistant Examiner

U.S. Cl. X.R.

279—37